United States Patent
Halonen et al.

(10) Patent No.: US 11,965,770 B2
(45) Date of Patent: Apr. 23, 2024

(54) SUSPENDABLE SCALE FOR WEIGHING A BUNDLE AND A FOREST MACHINE

(71) Applicant: Ponsse Oyj, Vierema (FI)

(72) Inventors: Marko Halonen, Vierema (FI); Taneli Heikkila, Vierema (FI); Arto Kaurala, Vierema (FI); Aleksi Kivi, Vierema (FI); Toni Kohio, Vierema (FI); Jari Korhonen, Vierema (FI); Vesa Kumara, Vierema (FI); Janne Laukkanen, Vierema (FI); Jami Leivo, Vierema (FI); Erkki Nivalainen, Vierema (FI); Jukka Ohtonen, Vierema (FI); Jouni Suutari, Vierema (FI); Heikki Vaisanen, Vierema (FI); Mika Vayrynen, Vierema (FI)

(73) Assignee: PONSSE OYJ, Vieremä (FI)

( * ) Notice: Subject to any disclaimer, the term of this patent is extended or adjusted under 35 U.S.C. 154(b) by 240 days.

(21) Appl. No.: 17/614,762

(22) PCT Filed: May 29, 2020

(86) PCT No.: PCT/FI2020/050362
§ 371 (c)(1),
(2) Date: Nov. 29, 2021

(87) PCT Pub. No.: WO2020/240093
PCT Pub. Date: Dec. 3, 2020

(65) Prior Publication Data
US 2022/0228905 A1    Jul. 21, 2022

(30) Foreign Application Priority Data

May 29, 2019    (FI) ...................................... 20195450

(51) Int. Cl.
*G01G 19/18*    (2006.01)
*A01G 23/00*    (2006.01)
(Continued)

(52) U.S. Cl.
CPC ........... *G01G 19/18* (2013.01); *A01G 23/003* (2013.01); *B60P 1/5433* (2013.01); *B66C 13/16* (2013.01);
(Continued)

(58) Field of Classification Search
CPC .... G01G 19/18; G01G 19/12; G01G 23/3735; G01G 3/141; G01G 3/1402; G01G 19/08;
(Continued)

(56) References Cited

U.S. PATENT DOCUMENTS 3,827,514 A    8/1974    Bradley
6,441,324 B1    8/2002    Stimpson
(Continued)

FOREIGN PATENT DOCUMENTS

EP    3409635 A1    5/2018

OTHER PUBLICATIONS

Intermercato. Intelweigh Compact 15MH crane scale. Publication date: Dec. 2018, Accessed on Dec. 3, 2019. URL: www.intermercato.com (2 pages).
(Continued)

Primary Examiner — Lynn E Schwenning
(74) Attorney, Agent, or Firm — LATHROP GPM LLP; Richard Beem; Alex Shtraym

(57) ABSTRACT

The invention relates to a suspendable scale for weighing a bundle, comprising:
  a first part for suspending the scale from a structure;
  a second part for suspending an implement from the scale;
  a third part joining the first part and second part, the first part, second part, third part being at least partly radially nesting relative to one another;
(Continued)

at least two strain gauges connected to the third part;
a wireless transmitter for sending the measurement data to an operator;
a self-powered power supply for feeding an electric current to the strain gauges and the wireless transmitter;
a first space formed in the scale to integrate the wireless transmitter inside the scale; and
a second space to integrate the power supply inside the scale.

The invention also relates to an arrangement for hoisting a bundle.

18 Claims, 10 Drawing Sheets

(51) Int. Cl.
    *B60P 1/54*     (2006.01)
    *B66C 13/16*     (2006.01)
    *G01G 19/12*     (2006.01)
    *G01G 23/37*     (2006.01)
    *B60P 3/41*     (2006.01)

(52) U.S. Cl.
    CPC .......... *G01G 19/12* (2013.01); *G01G 23/3735* (2013.01); *B60P 3/41* (2013.01)

(58) Field of Classification Search
    CPC ........ A01G 23/003; B60P 1/5433; B60P 3/41; B60P 1/48; B60P 1/54; B66C 13/16; B66C 3/005; B66C 23/36; B66C 23/90; E02F 9/264; G01D 11/24; G01L 1/2206

See application file for complete search history.

(56) References Cited

U.S. PATENT DOCUMENTS

| | | | | |
|---|---|---|---|---|
| 8,640,553 | B2* | 2/2014 | Barnett | .............. G01L 5/20 |
| | | | | 73/862.045 |
| 9,410,840 | B2* | 8/2016 | Acheson | ............... G01G 19/12 |
| 2004/0026135 | A1 | 2/2004 | Huitt | |
| 2008/0073129 | A1 | 3/2008 | Heuer | |
| 2008/0087475 | A1 | 4/2008 | Petrucelli | |
| 2012/0160575 | A1* | 6/2012 | Brown | .............. G01G 19/027 |
| | | | | 177/211 |
| 2015/0323377 | A1 | 11/2015 | Oberg | |
| 2017/0335644 | A1* | 11/2017 | Ciezobka | .............. E21B 47/04 |
| 2018/0103899 | A1* | 4/2018 | Cahan | ................ G01L 5/1627 |
| 2018/0252603 | A1* | 9/2018 | Jansen | ................. G01L 5/101 |

OTHER PUBLICATIONS

ISSU. Intermercato Intelweigh Wireless Crane Scale System (1 page).

Intermercato. Intelweigh Brochure for Wireless Crane Scale System (8 pages).

* cited by examiner

SUSPENDABLE SCALE FOR WEIGHING A BUNDLE AND A FOREST MACHINE

CROSS-REFERENCE TO RELATED APPLICATIONS

This application claims benefit of PCT/FI2020/050362 filed May 29, 2020, which claims benefit of Finnish Patent Application No. FI20195450, filed May 29, 2019, each of which is incorporated by reference in its entirety.

FIELD OF THE INVENTION

The invention relates to a suspendable scale for weighing a bundle, which includes
 a first part for suspending the scale from a structure supporting the scale,
 a second part for suspending an implement from the scale,
 a third part combining the first part and the second part, arranged to change shape from the effect of the implement acting on the first part and the second part and caused by the bundle to be hoisted by it,
 the first part, second part, and third part being at least partly radially nesting relative to one another,
 at least two, preferably 4-8 strain gauges connected to the third part for forming measurement data on the forces acting on it, on the basis of the deformation of the third part,
 a wireless transmitter to send the measurement data to an operator,
 a power supply for feeding an electric current to the strain gauges and the wireless transmitter.
The invention also relates to a forest machine.

BACKGROUND OF THE INVENTION

Traditionally in forestry and particularly in timber harvesting and timber sales, volume measurement, which is performed on the timber at the timber processing plant, has formed the established method of measurement. However, particularly from the viewpoint of logistics, it would be preferable to have the measurement performed at the earliest possible stage of the timber purchasing chain, most preferably immediately in connection with timber harvesting or the local transportation of timber. For this reason the measurement of load has moved more to a mass-based rate or fee to be paid, which for its part emphasizes the importance of the accurate weighing of individual bundles.

To weigh a bundle, a special scale is most typically fitted to the loader of a forwarder and used to weigh each bundle lifted. In this connection the term bundle refers to the individual transfer of a single or several trees/logs, for example from beside the forwarder to the forwarder's load space or vice versa, using a grab or other similar gripping element. Typically by summing the masses of the individual bundles the mass of the forwarder's load is obtained, and correspondingly by summing the masses of the loads the mass of the whole felling area's timber accumulation by timber grades is obtained. Because generally the measurement made with a scale is the only weighing in the entire operations chain, the result of the weighing must correspond with an acceptable accuracy to the real mass of the felled and transported bundles. The buyer and seller can then trust the correctness of the weighing. Above a scale is described as part of the weighing system, which is fitted to a loader acting as a hoist, particularly in the case of a forwarder or timber truck. The hoist can also be, for example, a set of hoisting booms, by which any bulk or piece goods can be moved, though the advantages of the solution according to the invention are emphasized in a weighing system, in which the special features of the material being weighed and the loading process itself cause deviation and inaccuracy in the weighing result.

Generally scales are known from the prior art, to which power is brought through the forest machine's set of hoisting booms, using the leads of the hoisting booms. Such a solution is, however, liable to faults, as in a forest machine the scale is subject to vibration and possibly also impacts, which gradually stress and damage the leads, finally cutting off the power supply to the scale. Damage to the power supply makes the scale useless.

From the prior art publication EP 3409635 A is known, which discloses, for example, a scale intended for forest machines is suspended from a supporting structure, i.e. the hoisting booms of a forest machine, and from which scale a selected implement is suspended, preferably a grab for gripping trees. The scale include three parts located radially relative to each other, which form the body of the scale. The first of the said parts is closest to the centre of the scale to suspend the scale, for example, from a rotation device suspended at the end of the set of hoisting booms, the second part surrounds the first part radially to suspend the implement from the scale, and the third part joins the first and second parts to each other radially. In addition, the scale includes strain gauges to measure the deformation of the third part to measure the forces travelling through the scale and thus to determine the bundle's mass, a wireless transmitter to send the measurement data produced by the strain gauges to a receiver, and a power supply to send electricity to the strain gauge and the wireless transmitter.

The measurement of the mass is based on the measurement of the elongation in the strain gauges in the aforesaid scale. When elongation occurs, the strain gauges' resistance in the measurement circuit changes, when the strain gauge's wire changes shape. Strain gauges can be made from different materials. Typically a strain gauge is made from a very thin conductor or membrane and its resistivity is 30-30 000 Ohm. When the strain gauge is loaded with a maximum load, its resistance changes by only a fraction of a percent of its resistivity. In practice, such a small change in resistance cannot be measured, so that in the case of strain gauges a so-called Wheatstone-bridge circuit is needed.

The wireless transmitter of publication EP 3409635 A is arranged as a separate unit on top of the scale, so that it does not disturb the deformation taking place in the third part of the scale. On the other hand, the location of the wireless transmitter on top of the scale facilitates the passage of the wireless signal from the wireless transmitter on to the receiver. In addition, it is easy to take electrical leads to a transmitter fitted on top of the scale, to feed current.

However, a drawback of the scale of the EP publication cited above is that a transmitter fitted on top of the scale is exposed to impacts and takes up space on top of the scale.

SUMMARY OF THE INVENTION

The invention is intended to create a suspendable scale for weighing bundles that is more reliable than suspendable scales. The present invention is characterized by a suspendable scale for weighing a bundle comprising a first part for suspending the scale from a structure supporting the scale, a second part for suspending an implement from the scale, a third part joining the first part and second part, arranged to change shape from an effect of the implement acting on the first part and second part and caused by a bundle to be hoisted by the implement, the first part, second part, and third part being at least partly radially nesting relative to one another, at least two strain gauges connected to the third part to form measurement data on forces acting on each strain gauge, on basis of deformation of the third part, a wireless transmitter for sending the measurement data to an operator, a self-powered power supply for feeding an electric current to the strain gauges and the wireless transmitter, a first space formed in the scale to integrate the wireless transmitter inside the scale and a second space to integrate the power supply inside the scale.

The scale according to the invention can be implemented without leads being taken from the structure supporting the scale, as the transmitter is wireless and the power supply is self-powered. The wireless transmitter and power supply fitted in the first and second spaces are shielded from impacts and do not cause protrusions in the scale. The scale can then be made lower and narrower than scales of the prior art, as the wireless transmitter does not need space on top of the scale. It is surprising that the wireless transmitter can be placed inside the scale, when the passage of wireless signals to the wireless transmitter is hindered. In connection with the scale according to the invention it has been observed that the structure supporting the scale surprisingly reflects wireless signals, thus permitting the use of a wireless transmitter and its placing inside the scale. In other words, the first space and second space are formed in the scale in such a way that neither the transmitter nor the power supply cause a protrusion in the scale's support surface. It is also surprising that the first and second spaces, which break the scale's homogenous structure in the part in which the strain gauges are placed, can be located in the scale, the deflections of which are measured to measure the weight of the bundle.

In this context, the term self-powered power supply refers to the fact that the power supply is an energy-storing power unit, such as a battery, or accumulator, or similar (power-cell).

Preferably the first and second spaces are separate spaces from each other. The spaces can then be located symmetrically on either side of the scale, so that the spaces will not distort the deformation of the third part thus weakening the scale's measurement accuracy.

In this context, the term the self-powered nature of the power supply refers to the external energy not being brought to the power supply along leads, for example, from the forest machine, but instead to the power supply being a battery or accumulator, which stores energy in the form of electricity.

Preferably the first part, the second part, and the third part are planar discs, of which the first part is fitted radially inside the second part, while the third part joins the first and second parts inside each other radially. Thanks to the radial construction the scale's structure is symmetrical, thus improving the scale's measurement accuracy. In other words the first part, second part, and third part are each planar pieces, in each of which is a centre hole, and the first part is radially innermost in the scale, the second part outermost, with the third radially between them.

Preferably the first part, second part, and third part are radially inside each other on essentially the same plane, so that the scale's structure can be quite low and all forces travel through the strain gauges.

The scale can include a total of four or eight strain gauges attached to the third part, which strain gauges are located on a first segment running through the centre point of the first part, symmetrically on both sides of the centre point of the first part, in such a way that on each side of the first part the number of strain gauges is half of the total number. When measuring the elongation on both sides relative to the first segment, the measurement can take account of the forces acting eccentrically on the scale, and which appear, for example, when weighing while the bundle is moving.

The strain gauges are preferably attached to the lower surface of the third part in the operating attitude of the scale. The strain gauges will then be protected from impacts and external detrimental factors.

The first space and second space are preferably located relative to the first segment symmetrically on both sides of a second segment, which runs through the centre point of the first part and is perpendicular to the first segment. In other words, the strain gauges, the first space, and the second space are located alternately relative to each other, so that each strain gauge is at the end of a 90° sector from the first space and the second space. The strain gauges are then located symmetrically relative to the spaces and the first and second spaces do not distort the forces acting on the strain gauges.

Due to the symmetry of the scale, the first space and second space are advantageously both equidistant from the strain-gauge sensors located at the ends of the first segment. Thus, it is easiest to take the first space and second space into account in the scale's computation.

The third part is preferably at least partly thinner than the first and second parts in a direction perpendicular to the plane of the scale, and the third part includes two annular grooves at a distance from each other radially, to increase the deflection of the third part. The use of annular grooves emphasizes the deformation of the third part at the annular grooves, thus facilitating the detection of deformations by the strain gauges. In other words, with the aid of the annular grooving made in the third part the measurement accuracy of the scale can be improved, while scarcely weakening the strength of the structure at all. At the annular grooves, the scale's thickness in the direction perpendicular to the scale's plane is less than elsewhere in the third part.

In the scale, the strain-gauges are preferably essentially horizontal when the scale is in its operating attitude. The scale can then be implemented as a low structure.

In this connection, reference to the direction of the scale's plane means the scale's radial direction, or its horizontal direction in the operating attitude.

At least one strain gauge is fitted to the third part on the opposite side of the third part relative to the annular grooves, aligned with the annular grooves on both sides of the first part, to measure the elongation at the relevant point in the third part. Measured at each annular groove, the deformation of the third part is greater than elsewhere over the third part and thus the deformation at various parts of the third part can be measured accurately, thus facilitating the measurement of the precise mass of the bundle.

The annular grooves are preferably formed in the upper surface of the third part. They then facilitate the deflection of the third part away from the fourth part in the direction of the loading.

In addition, in connection with the wireless transmitter there is preferably a 3D acceleration sensor to determine the attitude data of the scale for the compensation of the weighing of the bundle. The use of a 3D acceleration sensor allows an accurate weighing result to be obtained using strain gauges only in the first segment, making the construction of the scale simple. With the aid of a 3D acceleration sensor, it is possible to decide the implement's attitude and its effect of the weighing.

The 3D acceleration sensor can be an inertia measurement unit. With the aid of an inertia measurement unit it is possible not only to determine the accelerations acting on the scale but also the scale's state of motion, thus improving the accuracy of the weighing.

According to one embodiment, the strain gauges are located only on the first segment. The scale's construction can then be very simple.

The scale preferably includes, in addition, a discoid fourth part fitted between the second part and the implement arranged to be attached to the scale, to receive the torsional moments caused by the bundle hoisted by it. Thanks to the fourth part, the torsions acting on the implement are not able to transfer directly to the scale's second part supporting the implement. This in turn improves the scale's measurement accuracy.

The fourth part's diameter can be essentially the same as the second part's diameter. The fourth part then supports the second part optimally over the same diameter and does not cause an excess protrusion or weight in the scale.

A first thinning is preferably formed in the third part to increase the deflection of the third part. Thus, the deflection is emphasized and through it the detection by the strain gauges of deviations is facilitated. In addition, the thinning lightens the scale's total weight.

The scale preferably includes a second thinning formed in the fourth part in alignment with the first thinning to form a third space inside the scale for the strain gauges and their leads.

According to one embodiment, the strain gauges are full-bridge connected to compensate for temperature variations. Temperature variations do not then cause disturbances in the measurement and the measurement is therefore more accurate. The term full-bridge connection refers to a Wheatstone-bridge circuit, in which four strain gauges form a bridge circuit, i.e. there is no fixed resistance in the circuit, as there is in a half or quarter-bridge circuit.

The wireless transmitter may utilize wireless network protocols or other known wireless technologies, such as a Wi-Fi® or a Bluetooth®. It is surprising that wireless transmission technology can be used in a scale located under a rotation device or directly under the set of hoisting booms, the rotation device being at least a partial obstacle to the passage of the signal. In this connection it has been surprisingly observed that, for example, a forest machine's hoisting boom and rotation device actually effectively reflect a signal sent by a wireless transmitter. The use of a Bluetooth® transmitter is especially advantageous, as its power consumption is small, as is its range. The use of Bluetooth® has the additional advantage that it is easily compatible with the devices of many different manufacturers and the scale's data can be read or checked with the aid of, for example, a smart phone or separate reading device.

The scale preferably includes an upper surface facing towards the structure supporting the scale in the scale's operating attitude and a lower surface facing towards the implement suspended from the scale, in which the first space and second space are formed in the scale's upper surface. Located in the upper surface, the wireless transmitter's signal has a nearly unobstructed route forward from the wireless transmitter, whereas the fourth part is preferably attached to the scale's lower surface to receive the torsions of the implement, which would be an obstacle to a wireless signal.

A first cover of the first space and a second cover of the second space are preferably parallel to the scale's upper surface. This facilitates the opening of the covers and also permits, in the case of space, a low structure, suitable for use in a low scale according to the invention.

The first space and second space can be formed in the scale's second part or third part. The scale's first part suspended from the structure supporting it remains under, for example, the rotation device, whereas the upper surfaces of the second and third parts remain free, permitting free access to the first space and second space, for example for maintenance operations.

The strain gauges are preferably located only in the first segment and the scale includes a 3D acceleration sensor to form the scale's attitude data to compensate for the scale's attitude when weighing a bundle. Thus, the scale according to the invention can be implemented quite simply, as the strain gauges measure elongation only on a single measurement line.

There is preferably an opening in the centre of the first part, forming a route for taking leads to the implement through the scale from the structure supporting the scale. Thanks to the opening, the scale can be used together with completely rotating rotation devices. The leads taken through the opening are also inside the scale and safe from impacts.

According to one embodiment, the scale includes an outlet opening with a moisture-penetrable plug fitted to it for equalizing moisture and pressure with the environment. Thus, for example, excess pressure, which could damage the sealing of the scale, cannot form inside the scale.

The scale's 10 thickness is preferably 40-90 mm, preferably 50-70 mm. The scale is then low in structure, which facilitates, for example, placing the implement in the transport attitude in the load spaces of forest machines, as the height of the totality formed by the implement, scale, and rotation device does not become exceptionally great.

The scale's thickness can be 10-20%, preferably 17-25% of the scale's diameter.

The longitudinal direction of the strain gauges is preferably in the scale's radial direction. The strain gauges are then easy to implement and the scale's structure can be made low.

The first space and second space are preferably casing structures. A casing structure is easy to insulate.

The first space and second space are preferably identical in their plane-direction surface area and their shape, so that their effect on the scale's deflection is symmetrical.

The forest machine according to the invention is characterized by a forest machine comprising a set of hoisting booms, a rotation device suspended from an end of the set of hoisting booms, an implement suspended from the rotation device to hoist a bundle, as well as a scale to weigh the bundle, the scale comprising a first part for suspending the scale from the rotation device supporting the scale, a second part for suspending the implement from the scale, a third part joining the first part and second part, arranged to deflect from effect of the implement acting on the first part and second part and caused by the bundle to be hoisted by the implement, the first part, second part, and third part being at least partly radially nesting relative to one another, at least two strain gauges connected to the third part to form measurement data on the deflections of the third part, a wireless transmitter for sending the measurement data to an operator, a self-powered power supply for feeding an electric current to the strain gauges and to the wireless transmitter, a first space formed in the scale to integrate the wireless transmitter inside the scale and a second space to integrate the power supply inside the scale.

Good reliability is achieved with the aid of the arrangement according to the invention, as a wired connection, which is exposed to impacts and breaks in use, need not be formed to the scale. In addition, fitting the wireless transmitter and the self-powered power supply in the first and second spaces protects the said components from external impacts and leaves the scale's upper surface free.

Preferably the strain gauges are located relative to a segment running through the centre point of the first part, symmetrically on both sides of the centre point of the first part on the first segment joined to the third part, and the scale is attached to the implement, in such a way that pivot shafts of arms, belonging to the implement gripping an object to be hoisted, are parallel to the first segment. Then, for example, the longitudinal directions of the trees to be hoisted lie parallel to the first segment, so that the weighing of the bundle is accurate even when hoisting elongated bundles, for example when hoisting bundles of logs with the aid of a grab acting as the implement.

Preferably the arrangement is fitted in connection with a forest machine and the implement is a harvester head, or more preferably a grab for handling trees. The use of the arrangement according to the invention is particularly advantageous, as in forest machines various external loadings act on the scale to a considerably greater extent than, for example, in gantry cranes in industrial plants.

Preferably an opening is formed in the centre of the first part, forming a route for taking hoses through the scale from the structure supporting the scale to the implement. Thanks to the opening, the scale can be used together with completely rotating rotation devices.

Preferably a completely rotating rotation device is used in the arrangement according to the invention, and in the arrangement at least one set of leads is taken through the rotation device and the scale to take electricity or a compressed medium from the hoisting booms to the implement.

In addition, the arrangement preferably includes a wireless transmitter to send measurement data to be received. Thus, measurement data can be received, for example, in a forest machine, where it can be transferred to be processed in the control computer of the forest machine.

The wireless receiver preferably comprises a link to a data-transfer bus. Thus, the wireless receiver can be easily connected, for example, to existing systems in the forest machine. The link is preferably a CAN bus connection.

According to one embodiment the arrangement also includes a computation unit to calculate the mass of the bundle on the basis of the strain gauges' measurement data, which computation unit is preferably located separately from the scale. Thus, calculation can be performed at a place where power is easily available along cables and the power consumption of the computation unit is not a problem.

The arrangement preferably includes first attachment means to attach the scale from the first part to the structure supporting it, second attachment means to attach the fourth part to the second part, and third attachment means to attach the implement to the fourth part.

Preferably in the arrangement a computation unit, which is preferably at least part of the forest machine's control computer, is used for the final calculation of the bundle's mass. The computation unit can be implemented by a device configuration that includes a microcontroller and its memories. The computation unit can also be integrated in the receiver.

According to one embodiment the arrangement includes a rotation sensor of the hoisting booms to determine the position of the hoisting booms. With the aid of the rotation sensor it can be seen when it is best to perform weighing, i.e. is the bundle to be weighed, for example a bundle of trees, in the air, is the tree bundle dragging on the ground, or when the number of factors distorting the weighing result is at a minimum. With the aid of the rotation sensor the moment when weighing is performed can be automatically detected. The operator need not then always enter the moment of weighing, instead it is detected automatically without slowing the operator's work. The rotation sensor is preferably wireless.

Thanks to low-energy electronics and Bluetooth technology the battery's service life can exceed even 10 years if the weighing or measuring state is not used. This facilitates, for instance, the storage of the scale and reduces the detaching of the self-powered power source. The scale sends data on itself at regular intervals, for example, data on the battery's voltage or individuation data on the scale, though measurement is not used. This facilitates system diagnostics and permits, for instance, the use of a smart phone equipped with Bluetooth as a diagnostics tool or computation unit.

BRIEF DESCRIPTION OF THE DRAWINGS

In the following, the invention is described in detail with reference to the accompanying drawings showing some embodiments of the invention, in which.

DETAILED DESCRIPTION OF THE DRAWINGS

Figure 1:
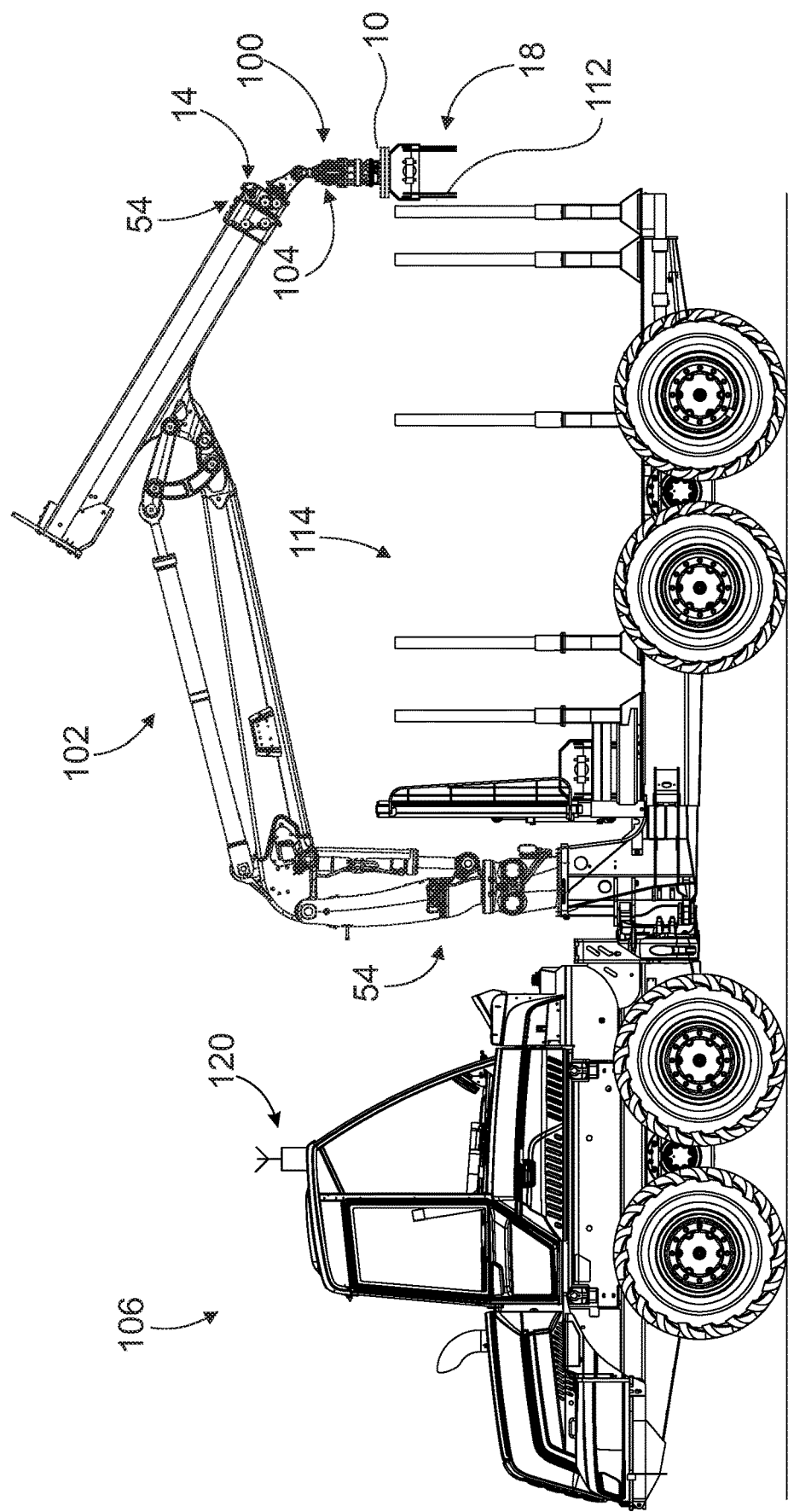
FIG. 1 shows a schematic image of a forest machine, which is fitted with the arrangement according to the invention comprising a scale according to the invention.

FIG. 1 shows the arrangement 100 according to the invention implemented in connection with a forest machine 106. It should, however, be understood that the arrangement according to the invention can also be implemented in other environments than forest machines. Such other implementation environments of the arrangement according to the invention can be, for example, various overhead cranes in production plants, trucks' hoists, harbour cranes, and similar. At its most advantageous, the arrangement and scale according to the invention are used, however, in connection with a forest machine, in which when hoisting a bundle the scale is also acted on by other than gravity acceleration components and in that way the weighing of the bundle is more demanding than usual. The implement suspended from the scale can be, for example, a forest machine's harvester head, but most preferably a grab intended to grip objects.

The forest machine 106 shown in FIG. 1 can be, for example, a normal forwarder, which includes a load space 114 fitted on top of a chassis and a set of hoisting booms 102 pivoted to the chassis at one end. With the aid of the set of hoisting booms 102 the trunks of already felled trees can be lifted into the load space 114, at the same time weighing the mass of each hoisted bundle. At one end 54 of the set of hoisting booms 102 there is preferably suspended a rotation device 104 while a scale 10 according to the invention is attached by its upper surface to the under surface of the rotation device 104. The implement 18 attaches to the under surface 46 of the scale 10. In this case the set of hoisting booms 102 acts as the structure 14 supporting the scale. The rotation device 104 is intended to permit the implement 18 to be rotated around an essentially vertical axis relative to one end 54 of the set of hoisting booms 102. In the embodiment of FIG. 1, a grab 112 for lifting trees is used as the implement 18.

Though in FIG. 1 the scale 10 is attached between the rotation device 104 and the implement 18, it should be understood that the scale according to the invention can also be situated between the set of hoisting booms and the rotation device. However, the scale is then a suspension scale, on which the weight of the rotation device also acts.

Figure 2:
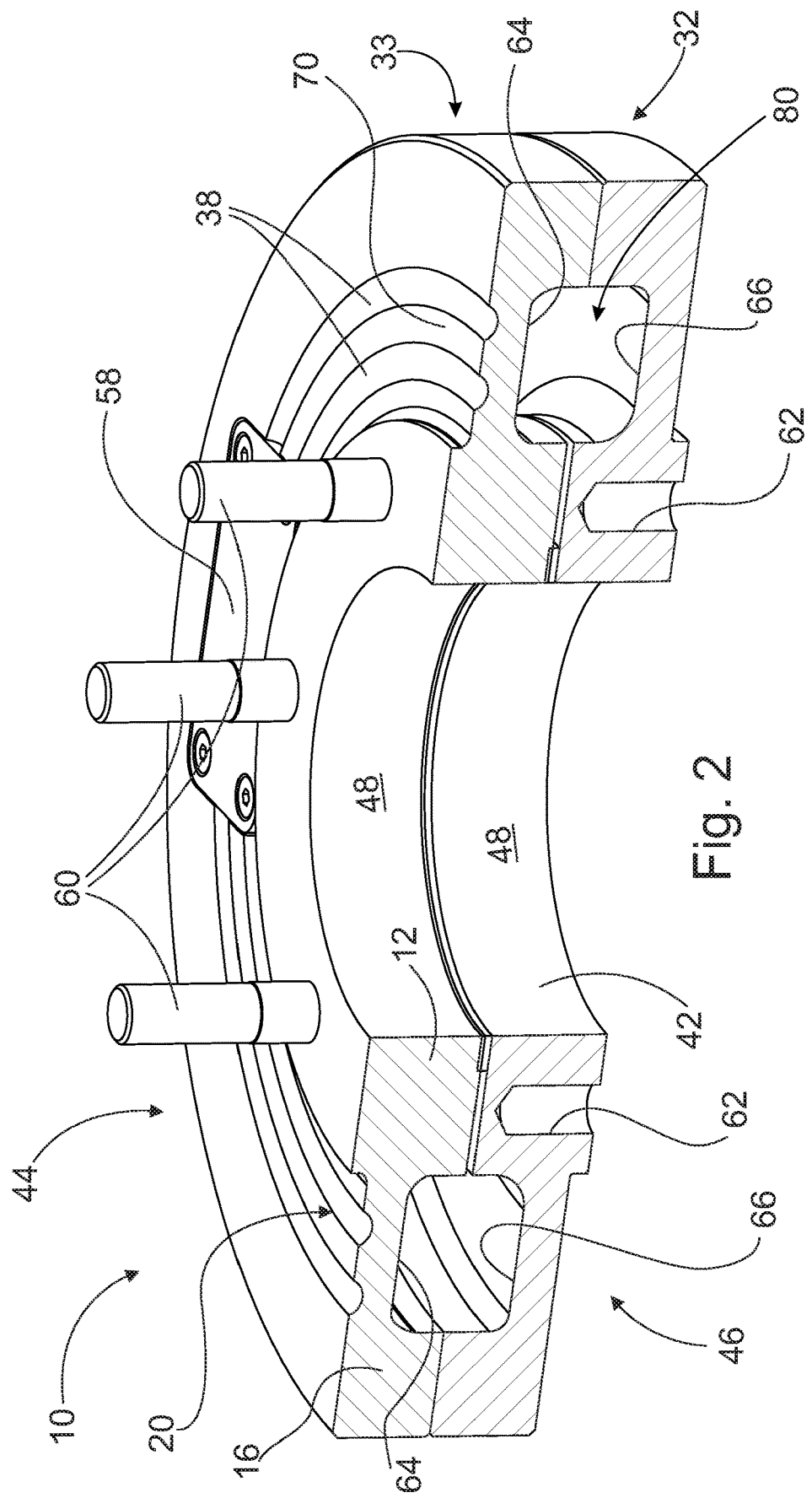
FIG. 2 shows an axonometric view of the scale according to the invention attached to a rotation device and an implement.
Figure 3:
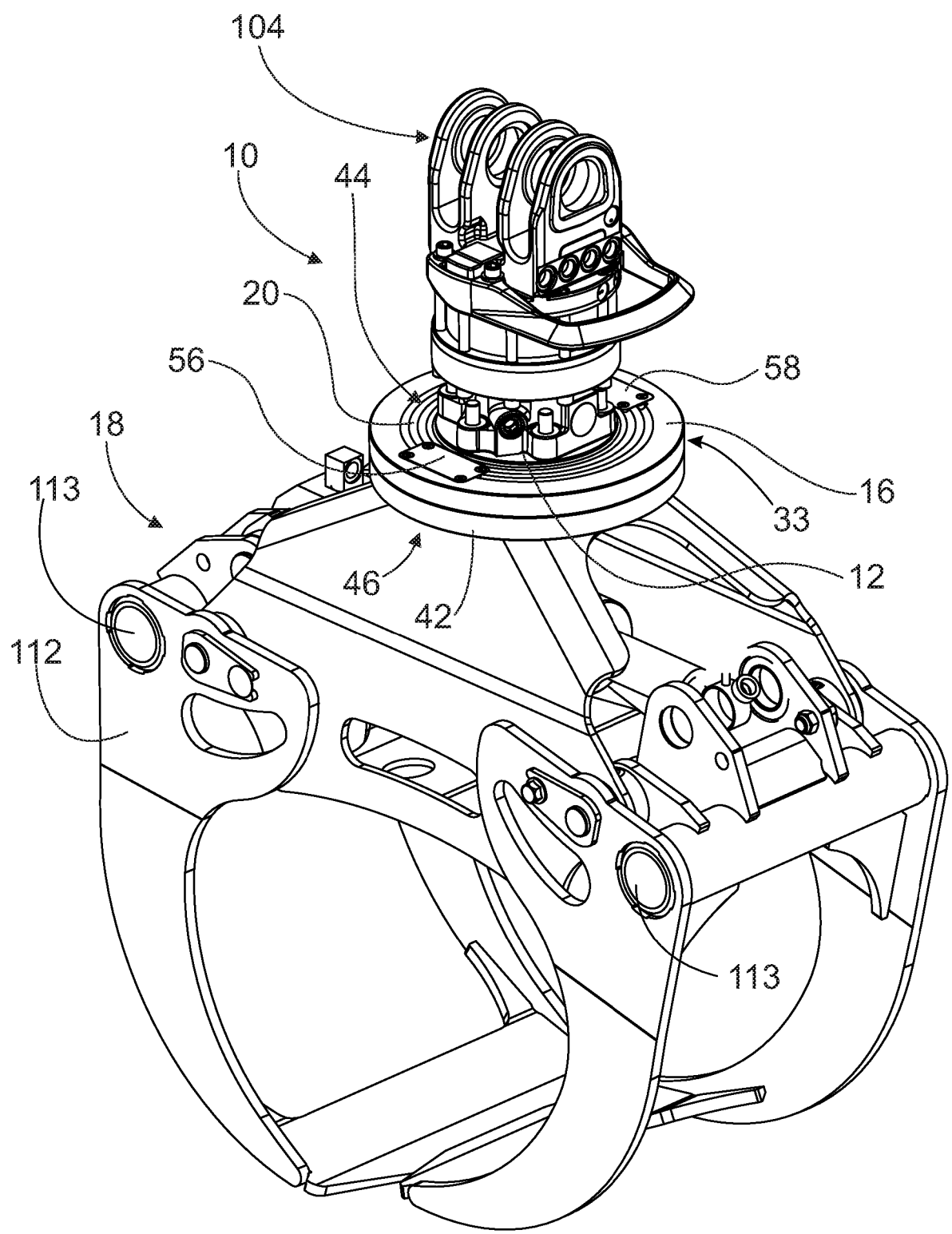
FIG. 3 shows a cross-section of the scale according to the invention.

According to FIG. 2, the scale 10 includes a first part 12, a second part 16, and a third part 20, which are preferably planar discs 32 on the same plane and radially nesting relative to each other. In addition, the scale 10 includes at least two strain gauges 22 shown in FIGS. 6a and 6b, a wireless transmitter 24 shown in FIG. 5, a self-powered power supply 26, as well as a first space 28 for the wireless transmitter 24 and a second space 30 for the power supply 26. The scale's operation is based on measurement of the strain gauges, in which the preferably four or eight strain gauges situated in the third part form advantageously a full (or two full) Wheatstone-bridge circuits. The elongation of the strain gauges changes the bridge circuit's output voltage, from which change the force acting on the scale can be determined and through it the mass of the bundle calculated. The first part 12 is arranged to be attached to the structure 14 supporting the scale 10, which is the rotation device 104 in the embodiments shown in FIGS. 1-6b. The first part 12 is surrounded by the second part 16 and these are joined together with the aid of the third part 20. The first part 12, second part 16, and third part 20 form the scale's 10 body 33. In the embodiment of FIGS. 1 and 3-4c the implement 18 is attached to the scale's 10 second part 16 using a separate fourth part 42.

The fourth part 42 acts preferably as an intermediate piece between the second part 16 and the implement 18 when attaching the implement 18 to the scale 10 according to FIGS. 1 and 3-4c. If deformations take place in the implement 18 when loading, the fourth part 42 receives these deformations, so that they do not pass directly to the scale's 10 body 33 and distort the measurement. For this purpose the fourth part 42 can be made a more rigid structure than the scale's 10 body 33. Preferably the first part 12, second part 16, third part 20, and fourth part 42 are all planar discs 32, i.e. discoid and circular metal plates, in which there is preferably a centre hole. The circular structure conditions the forces acting on the scale to become symmetrical, so that in the operating attitude the scale's transverse forces do not create an effect of different magnitude on the measurement due to the scale's geometry. As an alternative to the circular structure the first part can also have some other symmetrical shape, such as a cross, when the second and third parts too will be shaped to correspond to the first part, surrounding the first part radially. The radially nesting disc formed by the first part, second part, and third part can also be called the scale's upper part and the fourth part the scale's under part. Similarly, the first part can be called the upper part's inner circle, the second part the upper part's outer circle, and the third part its intermediate circle.

Figure 4A:
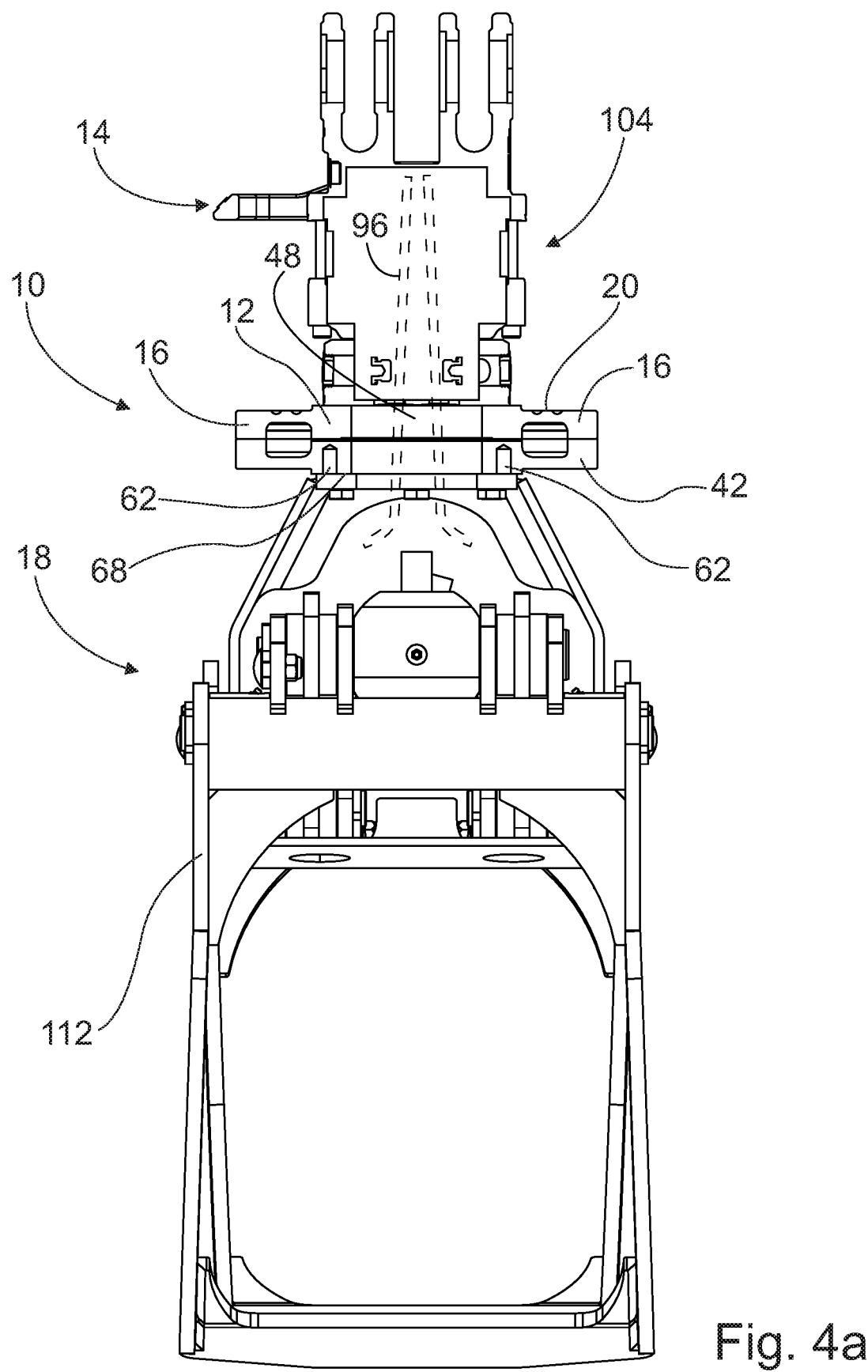
FIG. 4a shows a cross-section of the scale according to the invention and a rotation device supporting it and an implement suspended from the scale.
Figure 4B:
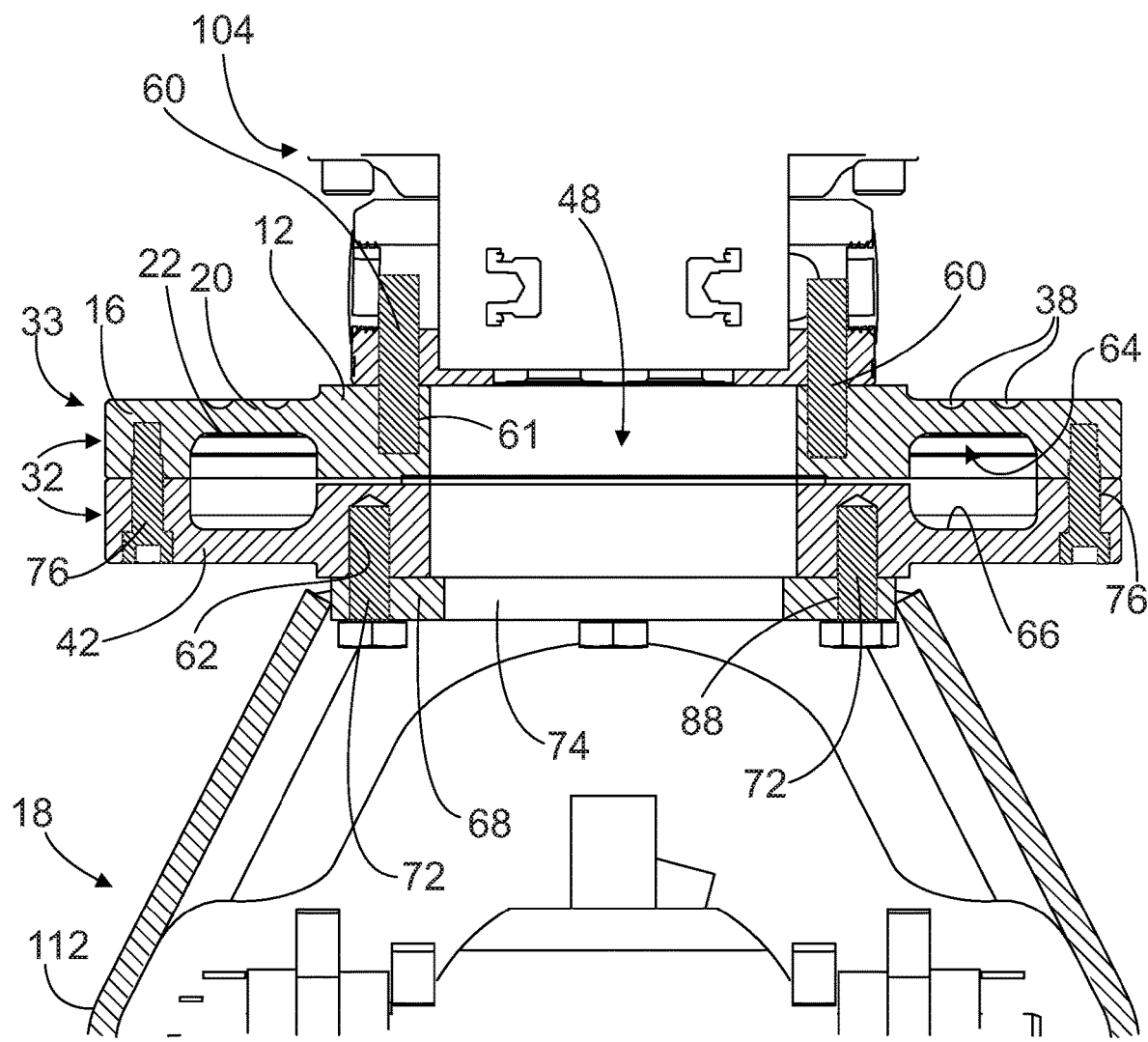
FIG. 4b shows an enlarged cross-section of the scale according to the invention and a rotation device supporting it and an implement suspended from the scale.
Figure 4C:
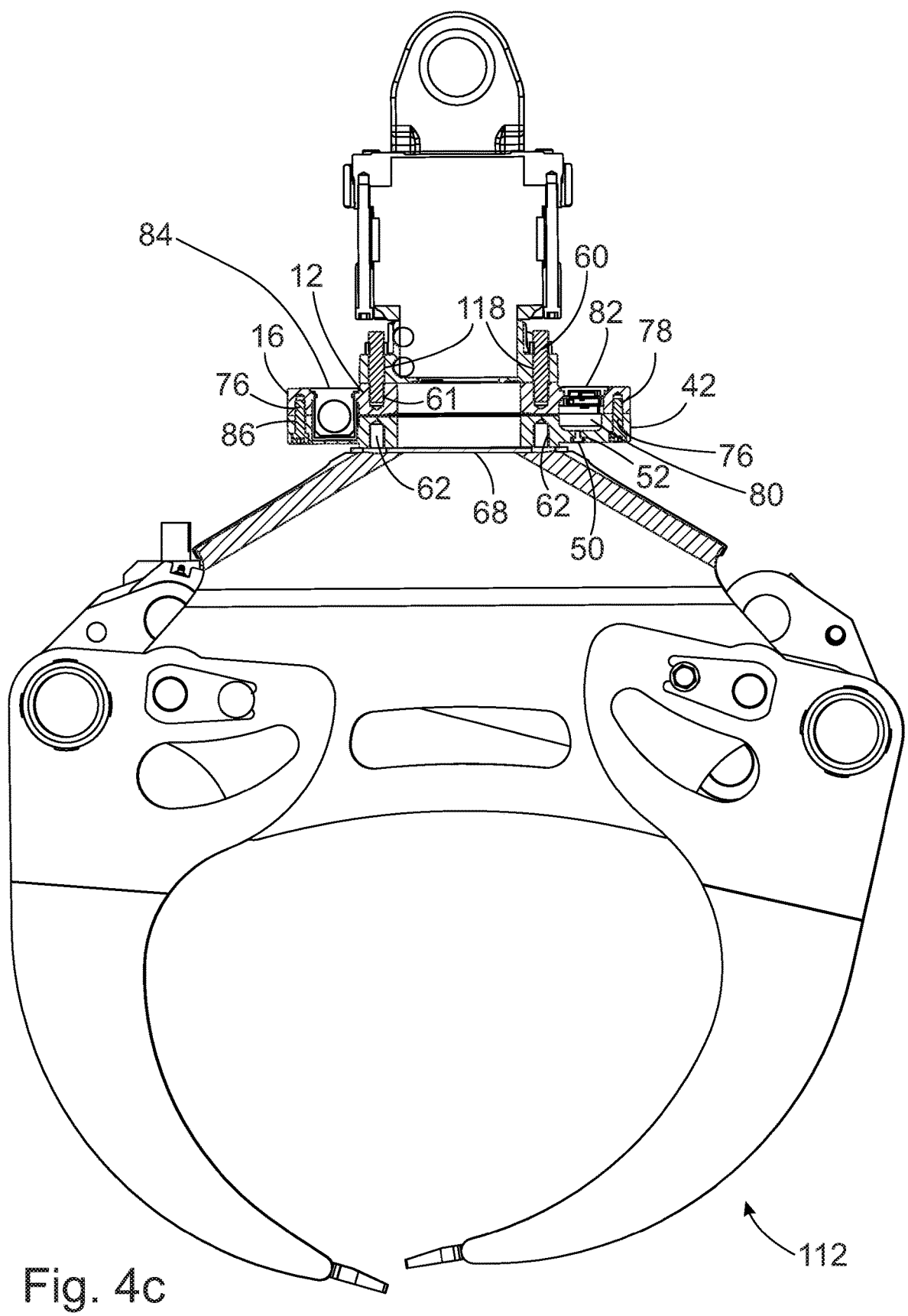
FIG. 4c shows a cross-section of the scale according to the invention sectioned from a different direction to FIGS. 4a and 4b.

Preferably there is a centre hole 48 according to FIG. 4c in the centre of the scale's 10 body's 33 first part 12, and also in the centre of the fourth part 42, permitting the conductors, i.e. leads 96 and the pressure-medium lines to be fed through the scale from the rotation device to the implement. Thus, for example hydraulic oil can be moved from the forest machine along the set of hoisting booms, through the completely rotating rotation device and scale, as far as the implement, which utilizes the hydraulic oil to operate hydraulic operating devices. Being led through the scale the leads are better protected from impacts than when led externally over the scale.

FIGS. 3 and 4a-4c show the scale's 10 attachment in greater detail. Though FIG. 4a does not show a section line, it should be understood that FIG. 4a, like FIG. 4b, shows a cross-section. FIG. 4c does not show the third attachment means that attach the implement 18 to the fourth part 42.

The scale 10 is attached from the body's 33 first part 12 to the structure 14 supporting the scale 10, which is either the set of hoisting booms 102 of FIG. 1 or preferably the rotation device 104 according to FIGS. 4a-4c. The attachment takes place with the aid of first attachment means. The first attachment means can include counter-threads 61 formed in the first part 12, into which grub screws 60 equipped with threads are screwed and locked, for example with an adhesive. The screws 60 protrude from the upper surface 44 of the first part 12. Correspondingly, the rotation device 104 can include as a part of the first attachment means openings 118 in its under part, through which the screws 60 are fitted. The scale 10 is preferably locked using the screws 60 to the openings 118 in the rotation device 104 (in FIG. 4c).

Figure 6A:
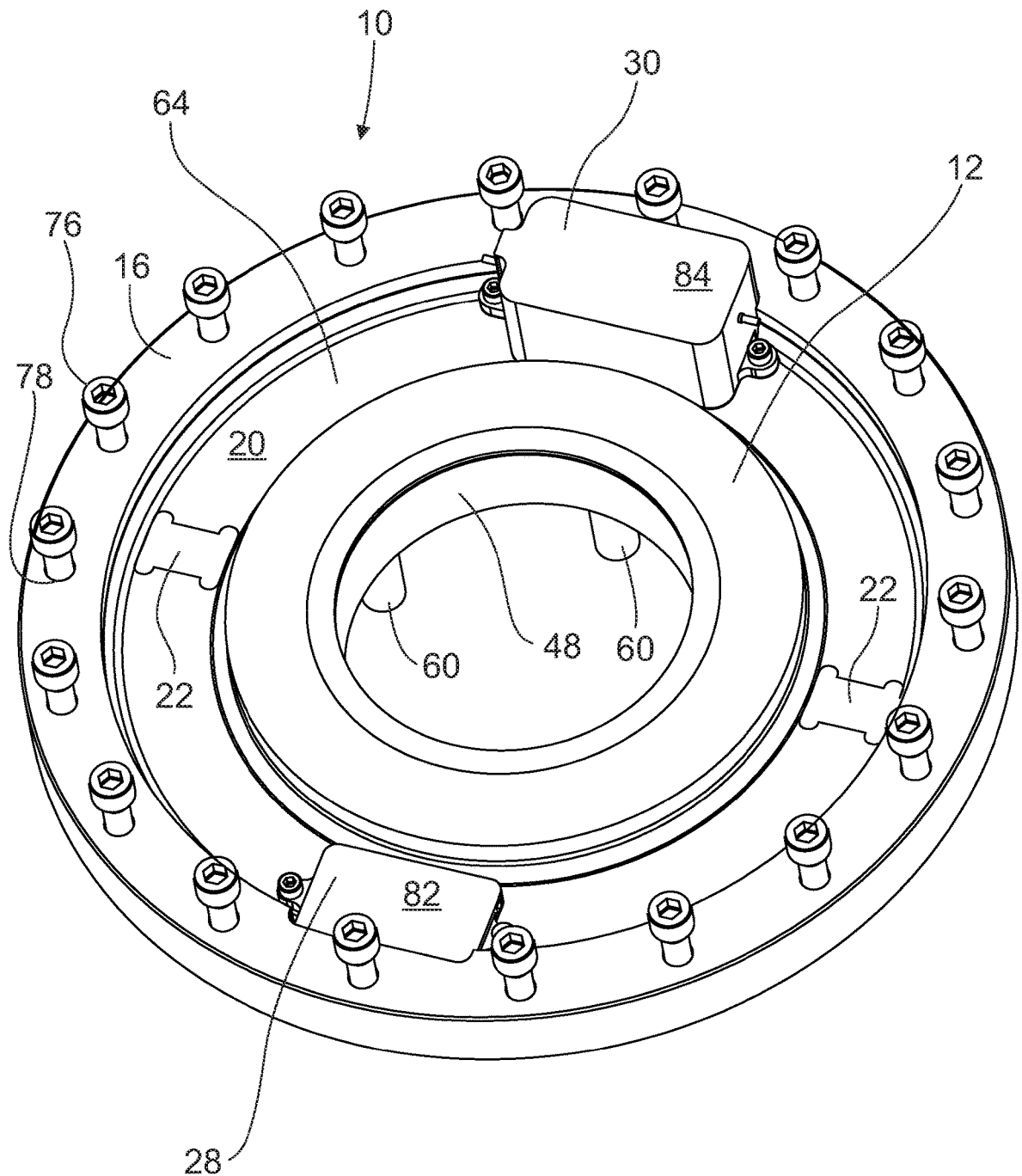
FIG. 6a shows an axonometric bottom view of the scale, seen without the scale's fourth part.
Figure 6B:
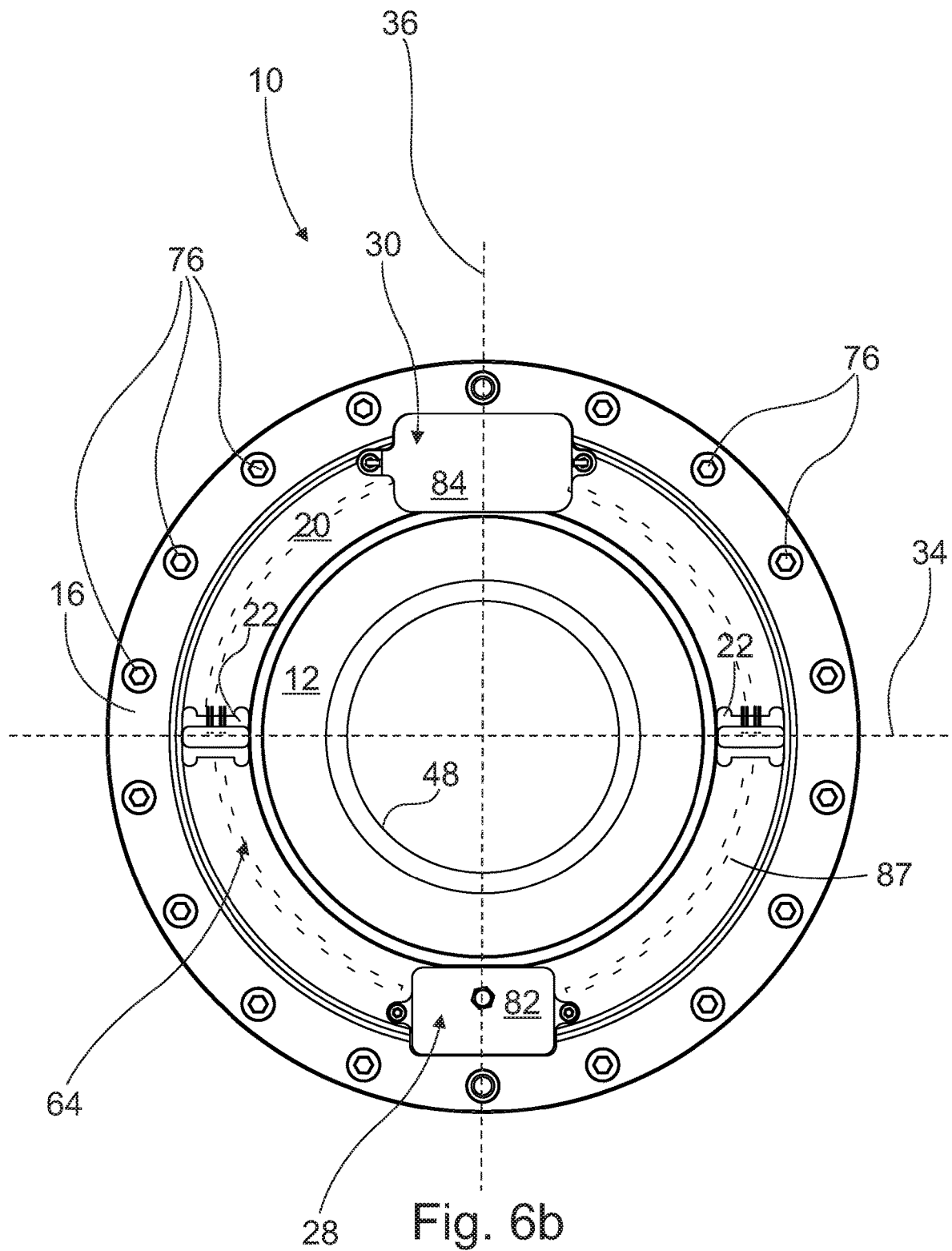
FIG. 6b shows the scale seen from directly below seen without the scale's fourth part.

The scale's 10 body 33 attaches to the fourth part 42 from the second part 16 with the aid of second bolts 76 seen in FIGS. 4c, 6a, and 6b. The second bolts 76 are part of the second attachment means. The second part 16 can include, in addition, second counter-threads 78 as second attachment means. The fourth part 42 includes in turn third openings 86 belonging to the second attachment means, through which the second bolts 76 are fitted and tightened in the second openings 78, locking the fourth part 42 to the scale's 10 body's 33 second part 16.

The locking of the fourth part 42 to the scale's 10 body 33 takes place only to the second part 16 according to FIG. 4c, so that when the scale 10 is loaded the first part 12 can move in a direction perpendicular to the scale's 10 plane, i.e. in the operating attitude mainly in a vertical direction when the third part 20 deflects. The effect of the number of the second bolts on the structure's operation has been studied by FEM computation and it has been shown that there must be 14-32, preferably 18-24 second bolts on the ring formed by the second part to achieve sufficiently stable locking. Using a larger number of bolts will not bring significant additional value, but if there are less than 18 second bolts, the scale's operation is weakened, allowing in uneven loading the implement's torsions to be partly transferred to the scale's body through the structural elasticity of the fourth part.

The implement 18 is attached to the scale's 10 fourth part 42 with the aid of third bolts 72 acting as third attachment means, according to FIG. 4b. The fourth part 42 also includes, as third attachment means, drill holes 62, in which are third counter-threads for the third bolts 72. The implement's 18 upper part includes at attachment flange 68, in which are fourth openings 88 to fit the third bolts 72 through the attachment flange 68 and to lock the third bolts to the fourth part's 42 drill holes 62. The attachment flange 68 also has preferably a second centre hole 74 for leads.

The scale's body is preferably formed by machining from a single cast piece. A first thinning 64, visible in FIGS. 2 and 4a-4c, is preferably formed in the scale's 10 body 33 in its surface facing the fourth part 42. With the aid of the first thinning 64 the deformation of the third part 20 when loading the scale can be emphasized. The fourth part 42 too preferably includes a second thinning 66, which is intended to form together with the first thinning 64 a third space 80 inside the scale 10, more specifically circumferentially between the scale's 10 body 33 and the fourth part 42. The third space 80 is used to fit the transmitter 24 and power supply 26 inside the scale 10 and protected from impacts. In addition, the third space 80 acts as a space for the leads between the strain gauges 22, wireless transmitter 24, and power supply 26, which are shown by the broken lines 87 in FIG. 6a. The third space 80 is preferably sealed. The fourth part 42 can include, according to FIG. 4c, an outlet opening 52 equipped with a plug 50 breathing in two directions, allowing moisture to exit from the third space 80, but at the same time preventing water from entering the third space 80 from the outlet opening 52. Such a moisture-permeable plug 50 can preferably be a plug utilizing a breathable, waterproof, and/or windproof material, such Gore-tex® or similar membrane. The moisture-permeable plug seeks to keep the third space 80 at the same relative humidity as the third space's 80 external spaces. The plug also preferably acts as a pressure-equalization valve, keeping the third space 80 at the same pressure as that of the surrounding space. Large pressure differences, which could cause leaks, do not then act on the seals used in the scale. Moisture removal from the third space is important in order to avoid corrosion of the strain gauges, which destroys the strain gauges. The outlet opening 52 and plug 50 are preferably situated in a protected place, as far as possible from oil sprays due to pipe breaks and mechanical stresses.

Figure 5:
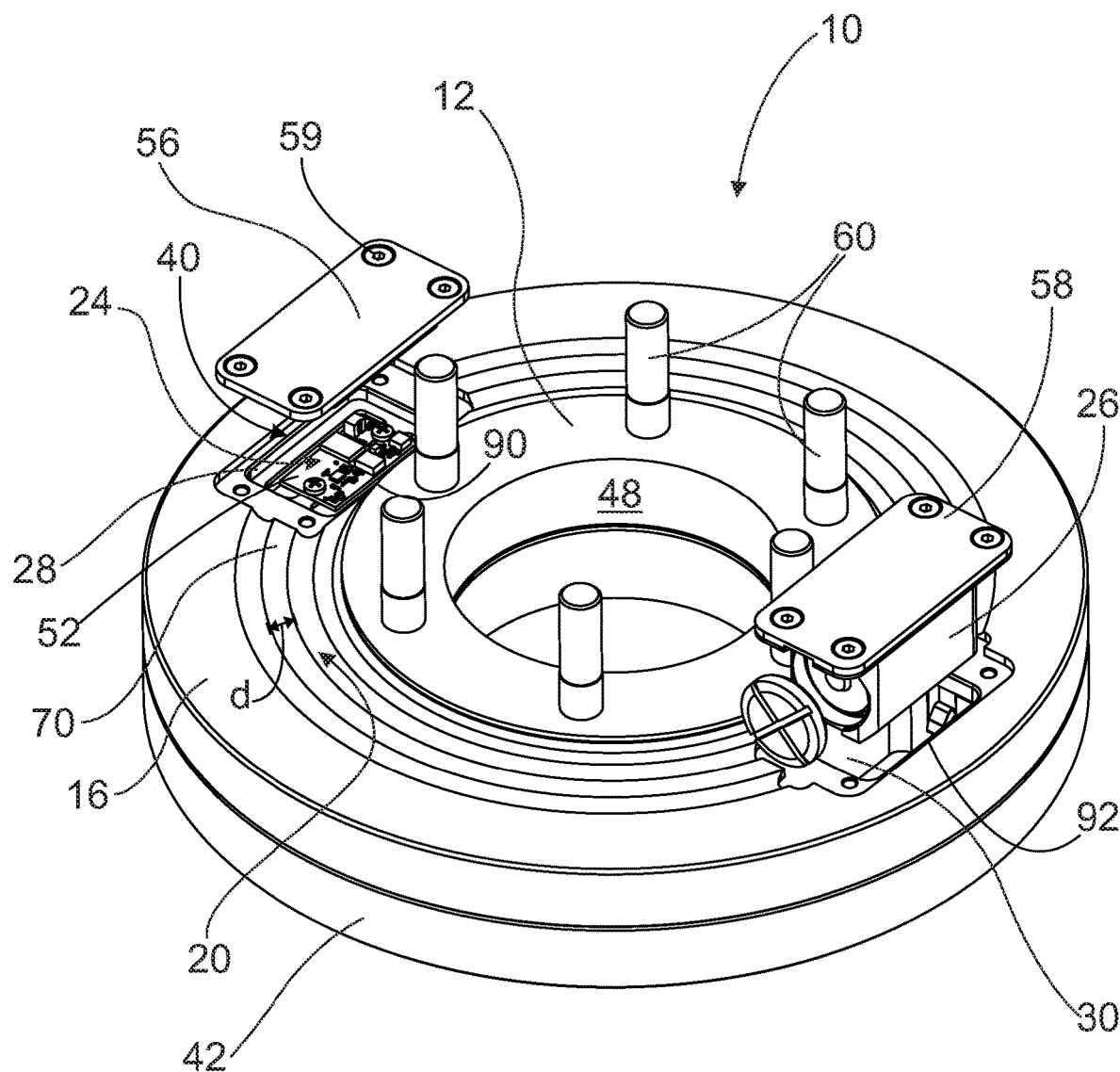
FIG. 5 shows a partly exploded axonometric view of the scale according to the invention, when the transmitter and power supply have been lifted out of the first and second spaces.

The third part 20 preferably includes two annular grooves 38 at a distance d from each other radially, according to FIG. 5. The annular grooves 38 are like rings when the scale's 10 body 33 is a circular structure. The annular grooves 38 are preferably situated radially in the area of the third part 20, close to the innermost and outermost edges of the first thinning 64, according to FIG. 2, so that at the annular grooves 38 the third part 20 is vertically thinner than in the case of the web 70 remaining between the annular grooves 38. Thanks to the first thinning 64, the third part 20 is preferably thinner over its entire radial width than the first part 12 and the second part 16, when the forces acting through the first part 12 and second part 16 through the third part 20 bend the third part 20 but not the first part 12 and second part 16, which are essentially rigid. In this connection, the term essential rigid refers to the fact that the deflection of the first and second parts is less than 1% of the third part's deflection. When loaded, the third part's deflection can be in the order of 0.01-0.2 mm. The third part's 20 annular grooves 38 cause the third part's deflection to be focussed on a small distance in the third part 20 precisely at the annular grooves 38.

Alternatively, instead of two grooves a single wider groove can also be used, but then a smaller portion of the third part's elongation comes at the groove and in that way detection of the elongation is more difficult.

The strain gauges 22 are preferably attached to the third part 20 and more specifically to the first thinning 64 according to FIG. 6a aligned with the annular grooves, so that the strain gauges 22 measure the deformation in the third part 20 in the radial direction of the third part 20. Thus, the strain gauges can be essentially the width of the annular grooves in the radial length of the third part. The distance of the annular grooves from each other, i.e. the distance d, can be 10-60 mm, preferably 20-40 mm. The width of the annular grooves can be 5-25 mm, preferably 15-20 mm and their depth 5-15 mm, preferably 8-12 mm.

The strain gauges 22 are preferably attached to the under surface of the third part 20 in the scale's 10 operating attitude, radially to the first thinning 64, according to FIG. 6b. More specifically, the strain gauges 22 are preferably glued to the surface of the third part 20. So that the strain gauges can measure the deformation of the third part reliably, the under surface of the third part must be machined to a sufficient smoothness, for example by face grinding. To improve the adhesion of the strain gauges, the face-ground surface is further roughened, for example manually, using 150-400 sandpaper to improve the adhesive's adhesion.

The strain gauges can be according to the prior art, such as, for example, the strain gauges marketed by the German manufacturer Hottinger Baldwin Messtechnik GmbH:n (HBM) under the product name HBM 1-LY41-10/120-1000. The strain gauges measure the elongation of the third part with the aid of a lattice inside each strain gauge. The length of the strain gauges' lattice can be 4-20 mm, preferably 6-10 mm. When the lattice stretches, its resistance changes, when the output voltage in the bridge circuit changes. The value of the elongation experienced by the strain gauge is the mean value of the elongation under its measurement lattice. On the other hand, strain gauges can also be used to measure the compression of the lattice at another point in the third part. Maximizing the elongation of the area under the lattice also maximizes the change in its resistance.

By machining the annular grooves at optimized places in the third part, the elongation is maximized under the strain gauges without weakening the scale's structural strength. By placing the strain gauges at the annular grooves the greatest elongation is aligned with the strain gauges, thus improving the measurement accuracy. In a scale, in which there are no annular grooves in the third part, the elongation of the third part is distributed evenly over the entire distance of the third part and is then smaller at the strain gauges and more difficult to detect.

According to FIGS. 6a and 6b, the strain gauges 22 are preferably situated in the first thinning 64 in such a way that the strain gauges are distributed on both sides of the centre point on a first segment 34 drawn through the centre point of the scale 10. The strain gauges 22 then measure the deformations of the third part 20 symmetrically on both sides of the centre point of the first segment 34. The strain gauges are connected according to the prior art by a Wheatstone-bridge circuit, a change in voltage is determined from a change in resistance and through it the deformation of the third part and then the bundle's mass. When using four strain gauges the strain gauges can be full-bridge connected, when a temperature-compensated circuit will be achieved which is not affected by temperature changes. When using two strain gauges a half-bridge circuit can be used, but then the temperature must be compensated otherwise. In the embodiment of the scale according to the invention of FIGS. 6*a* and 6*b* there are only two strain gauges 22, but preferably there are two strain gauges on each side of the first segment relative to the centre point, each on one annular groove.

Thanks to the annular third part 20 the third part's 20 deflection is quite symmetrical over the entire third part 20 at any point at all in the scale's sector. So that the deflection would be as symmetrical as possible, the first space 28 and second space 30 are preferably formed on the second segment 36 according to FIG. 6*b*, when they are a 90° sector away from the strain gauges 22 symmetrically on both sides of the second segment 36 relative to the centre point according to FIGS. 6*a* and 6*b*. The first space 28 and second space 30 are preferably also identical in plane-direction surface area and shape, when their effect on the deflection of the third part 20 will be symmetrical. The first space 28 is preferably shallower in depth, in the direction perpendicular to the plane of the scale's 10 body 33, than the second space 30. This is due to the wireless transmitter 24 situated in the first space 28 being lower in height than the self-powered power supply 26 in the second space 30.

According to FIG. 5, the first space 28 and second space 30 preferably form a first opening 90 for the first space 28 and a second opening 92 for the second space 30 in the second part 16 or third part 20 or both. In this case, the first opening 90 and second opening 92 penetrate the first part, extending to the third space 80 formed between the scale's body 33 and the fourth part 42, which is shown in FIG. 2. The first space 28 is not only a first opening 90 but also a first casing 82 shown in FIGS. 6*a* and 6*b*, inside which the wireless transmitter 24 is fitted. The first casing 82 encloses the wireless transmitter 24 thus preventing water and moisture from coming in contact with the wireless transmitter 24. Further, the first space 28 includes a first cover 56, shown in FIGS. 5, which closes the first space 28 against the first casing 82 to form a hermetic space. The cover 56 closing the first space 28 is preferably of plastic, when it will hardly neither disturb nor attenuate the wireless transmitter's 24 transmitted signals. The first cover is preferably made from POM plastic, which is penetrated extremely well by the wireless transmitter's signal. In addition, the wireless transmitter itself is located close to the scale's upper surface, which also improves the passage of the wireless transmitter's signal.

If the wireless transmitter is extremely low, in some cases the first space can be formed entirely onside the scale's body, when an opening penetrating the scale's body is not formed. In this case the first casing is not needed, but only a recess made in the scale's body.

Correspondingly the second space 30 includes, in addition to the second opening 92, a second casing 84 shown in FIG. 6*a* inside which the power supply 26 is fitted. The second casing 84 encloses the power supply 26, thus preventing water and moisture from coming in contact with the power supply 26. Further, the second space 30 includes a second cover 58 seen in FIG. 5, which closes the second space 30 against the second casing 84 to form a hermetic space. Both the first cover 56 and the second cover 58 can be detachably locked in place with the aid of separate screws or bolts 59. The use of detachable covers permits the servicing when needed of the wireless transmitter and the electronics in it, and of the power supply. The second cover 58 too is preferably made from POM plastic. The first cover and second cover are made from plastic also for the reason that metallic covers are relatively rigid, thus affecting the scale's reading. A plastic cover's effect on rigidity is small, so that the cover's effect on the scale's measurement result is negligible. The first and second casings too are preferably made from plastic, so that they bend when the third part bends and do not interfere with the measurement.

Figure 7:
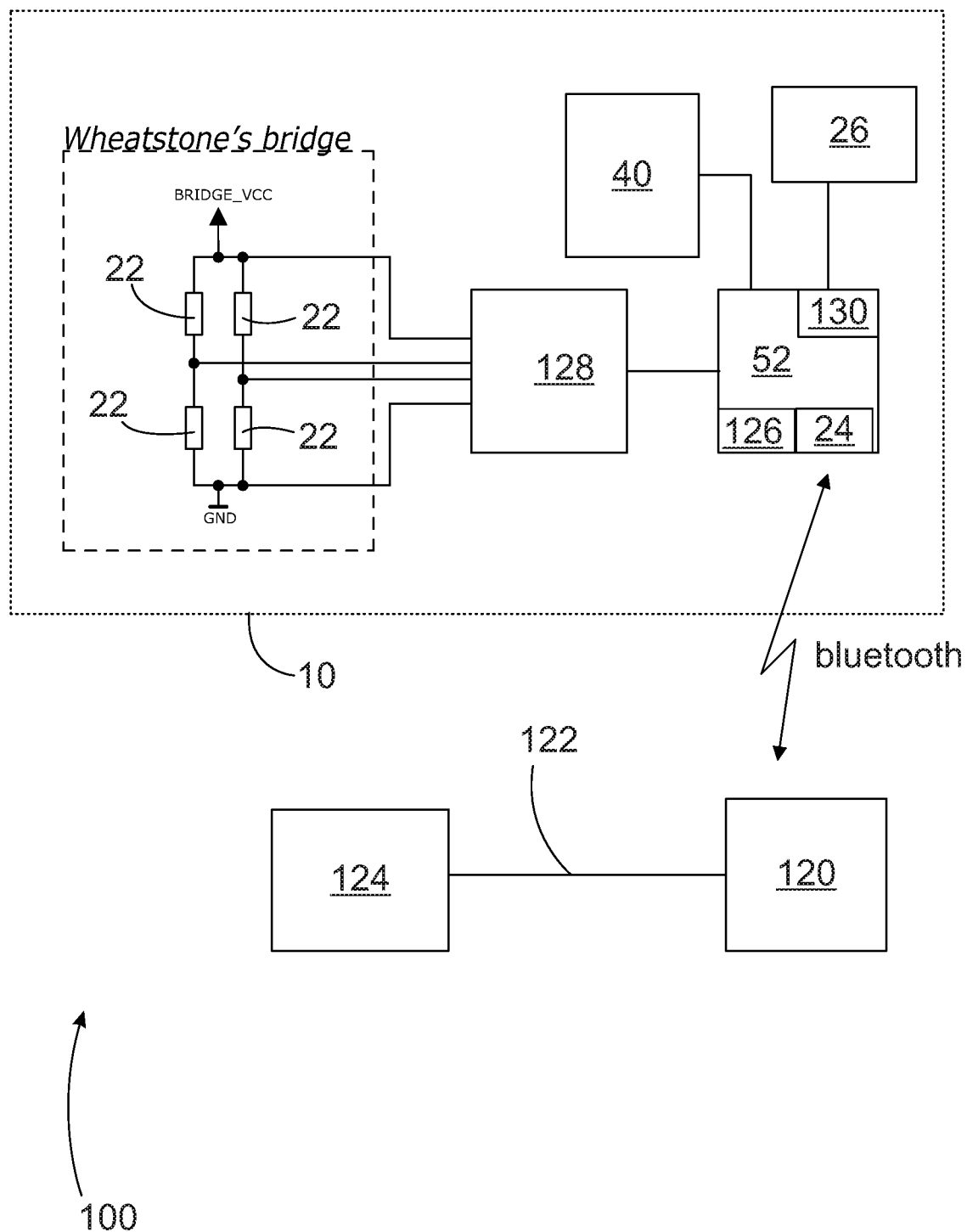
FIG. 7 shows a schematic circuit diagram of the scale according to the invention.

The scale 10 according to the invention preferably also includes the 3D acceleration sensor 40 shown in FIGS. 5 and 7 for forming the scale's 10 attitude data and to compensate the scale's weight measurement on the basis of the attitude data. The 3D acceleration sensor 40 is preferably situated in the first space 28 together with the wireless transmitter 24, on the electronics card 52 shown in FIG. 5. The 3D acceleration sensor can measure the scale's attitude relative to a gravity vector. Such measurement does not, however, allow for the scale's state of motion. More preferably the 3D acceleration sensor is an IMU (Inertia Measurement Unit) sensor, i.e. an inertia measurement unit, which measures both 3D acceleration and angular acceleration and thus also detects the scale's state of motion. The tilt data obtained with an IMU sensor is thus more comprehensive than the data obtained with a 3D acceleration sensor.

The wireless transmitter 24 and the 3D acceleration sensor 40 are preferably fitted to the same circuit card, which is situated in the first space 28. Preferably the first space's 28 first casing 82 is also filled with a protective mass after installation of the electronics card, thus protecting the electronics card from moisture. When using a 3D acceleration sensor, the scale's measurement with strain gauges 22 can be performed using strain gauges 22 placed on a single straight line. The third part's deformation is then measured using strain gauges in a single measurement bridge and the possible effect of the scale's attitude on the third part's deformation is taken into account computationally. Thus, the scale can be implemented reliably with fewer strain gauges than without a 3D acceleration sensor. In implementation without a 3D acceleration sensor strain gauges would have to be installed on at least two straight lines, if the bundle is weighed while moving. In calculation, the acceleration measured by the 3D acceleration sensor can be taken into account for simply using the basic physical formula F=ma.

According to FIG. 7, the electronics card 52 preferably includes a microcontroller 126, a wireless transmitter 24 for data transfer, a 24-bit AD converter 128 to convert the strain gauges' 22 analog signal into digital form, a 3D acceleration sensor 40 to detect the scale's tilt and preferably also state of motion, and a current-control circuit 130 to feed current to the electronics card's 52 components and to the strain gauges 22.

The arrangement according to the invention preferably includes, in addition, the wireless receiver 120 shown in FIG. 7, which is located, for example, in connection with the cab, where it can connect with the forest machine's data-transfer bus 122. The scale can preferably operate in such a way that measurement data are sent to the wireless receiver 120 from the scale using, for example, a Bluetooth connection with the aid of the wireless transmitter 24. The values are not calculated by the scale 10 using the self-powered power supply 26, but preferably by the forest machine's control computer 124, to which the measurement data are transferred from the wireless receiver 120, for example using the forest machine's data bus 122. This reduces the scale's power consumption. The data bus is preferably a CAN bus.

The voltage of the strain gauges' 22 measurement bridge has its own voltage regulator, i.e. current-control circuit 130, but the same measurement bridge voltage goes to the 24-bit AD converter 128. Precise measurement requires data for the AD converter 128 on the measurement bridge's voltage or its change. Therefore in the Wheatstone circuit the measurement bridge's voltage connects as a reference to the AD converter. The same also applies to the ground connection marked by GND in FIG. 7.

The measurement data to be sent can be all the values to be measured in the scale, for example, the battery voltage, the AD converter's values or the strain-gauge circuits' values or both, temperature, the tilt sensors values in the X, Y, and Z directions, and in addition time-stamp data and "field-strength data" RSSI. Using the identifier data sent with the measurement data, a protected connection is formed between the wireless transmitter and the wireless receiver. The computation unit used to calculate the bundle's final mass, which is preferably at least part of the forest machine's control computer, can be implemented with a device configuration that includes a 16-124-bit processor, a 128-1024-kB Flash memory, and a 16-128-kB RAM central memory. The computation unit can also be integrated in the wireless receiver.

The wireless transmitter used is preferably a low-energy Bluetooth module, for example a Bluetooth 4.2 module or a newer version, which has an internal antenna and which used the common Bluetooth 2.4-GHz frequency. The low-energy wireless transmitter permits, for its part, low energy consumption when transmitting the measurement data. The scale's self-powered power supply can then be, for example, a Saft LS 3.6-V 17-Ah Li-SoCl$_2$ battery, which has a service life of at least 6 months, but possibly more than a year. The battery can be easily changed by opening the second space's second cover. The wireless transmitter's transmission range is preferably 10-20 m, preferably 10-15 m. By placing the scale under the rotation device it has been observed surprisingly that the rotation device's structure acts as an element reflecting the wireless transmitter's signal.

The scale's outer diameter can be 200-500 mm, preferably 300-400 mm and its thickness 40-90 mm, preferably 50-70 mm. The centre hole's diameter can be, for example, 100-150 mm or 25-40% of the scale's diameter. The material used in the scale's body and fourth part is preferably stainless steel, which can be for example Hardox 900 grade. The scale's body in the third part can be 12-mm thick.

In terms of the operation of the scale and arrangement according to the invention it is important that the scale is installed in connection with the grab acting as the implement in such a way that the strain gauges are in the first segment essentially parallel to the trees lifted by the grab. In other words, the radial direction of the strain gauges is essentially parallel to the pivot shafts 113 or arms of the grab's arms.

The invention claimed is:

1. A suspendable scale for weighing a bundle, comprising:
a first part for suspending the scale from a structure supporting the scale;
a second part for suspending an implement from the scale;
a third part joining the first part and second part, arranged to change shape from an effect of the implement acting on the first part and second part and caused by a bundle to be hoisted by the implement, the first part, second part, and third part being at least partly radially nesting relative to one another, wherein the third part is, in a direction perpendicular to a plane of the scale, at least partly thinner in thickness than the first part and second part, and the third part includes two annular grooves at a distance from each other radially, to increase deflection of the third part;
at least two strain gauges connected to the third part to form measurement data on forces acting on each strain gauge, on basis of deformation of the third part;
a wireless transmitter for sending the measurement data to an operator;
a self-powered power supply for feeding an electric current to the strain gauges and the wireless transmitter;
a first space is formed in the scale to integrate the wireless transmitter inside the scale and
a second space to integrate the self-powered power supply inside the scale.

2. The scale according to claim 1, wherein the first part, second part, and third part are planar discs, of which the first part is fitted radially inside the second part, the third part thus joining the first part and second parts radially to nest inside each other.

3. The scale according to claim 1 further comprising four or eight strain gauges in total joined to the third part, which strain gauges are situated on a first segment running through a center point of the first part symmetrically on either side belonging to the first part's center point, in such a way that on each side of the first part a number of strain gauges is half of a total number of strain gauges.

4. The scale according to claim 3, wherein the first space and the second space are situated relative to the first segment on both sides of the first segment symmetrically on a second segment, which runs through the center point of the first part and is perpendicular to the first segment.

5. The scale according to claim 3 wherein the first space and the second space are identical in surface area and shape in a direction of a plane of the scale and the strain gauges are situated only on the first segment.

6. The scale according to claim 1, wherein at least one strain gauge is fitted to the third part on an opposite side of the third part relative to the annular grooves, aligned with the annular grooves on both sides of the first part, to measure the elongation at a relevant point in the third part.

7. The scale according to claim 1, wherein the first space and second space are identical in surface area and shape in direction of a plane of the scale.

8. The scale according to claim 1, further comprising a discoid fourth part arranged between the second part and the implement to be attached to the scale, to receive the torques caused by the implement.

9. The scale according to claim 8, wherein a diameter of the fourth part is essentially the same as a diameter of the second part.

10. The scale according to claim 1, wherein the strain gauges are full-bridge connected, to compensate for temperature variations.

11. The scale according to claim 1, wherein the wireless transmitter is a Wi-Fi transmitter.

12. A forest machine comprising a set of hoisting booms, a rotation device suspended from an end of the set of hoisting booms, an implement suspended from the rotation device to hoist a bundle, as well as the scale of claim 1 to weigh the bundle, said scale comprising:
a first part for suspending the scale from the rotation device supporting the scale;
a second part for suspending the implement from the scale;
a third part joining the first part and second part, arranged to deflect from effect of the implement acting on the first part and the second part and caused by the bundle to be hoisted by the implement, wherein the first part, the second part, and the third part are at least partly radially nesting relative to one another;
at least two strain gauges connected to the third part to form measurement data on the deflections of the third part;

a wireless transmitter for sending the measurement data to an operator;
a self-powered power supply for feeding an electric current to the strain gauges and to the wireless transmitter;
a first space formed in the scale to integrate the wireless transmitter inside the scale; and
a second space to integrate the power supply inside the scale.

13. The forest machine according to claim 12, wherein the said strain gauges are located symmetrically on both sides of the first part relative to a first segment running through a center point of the first part to a second segment perpendicular to the first segment connected to the third part and the scale is connected to the implement in such a way that pivot shafts of arms gripping an object to be hoisted and belonging to the implement are parallel to the first segment.

14. The forest machine according to claim 12, wherein the implement is a grab for handling trees.

15. The scale according to claim 1, wherein the wireless transmitter is a Bluetooth transmitter.

16. A suspendable scale for weighing a bundle, comprising:
a first part for suspending the scale from a structure supporting the scale;
a second part for suspending an implement from the scale;
a third part joining the first part and second part, arranged to change shape from an effect of the implement acting on the first part and second part and caused by a bundle to be hoisted by the implement, the first part, second part, and third part being at least partly radially nesting relative to one another, wherein the third part is, in a direction perpendicular to a plane of the scale, at least partly thinner in thickness than the first part and second part, and the third part includes two annular grooves at a distance from each other radially, to increase deflection of the third part;
at least two strain gauges connected to the third part to form measurement data on forces acting on each strain gauge, on basis of deformation of the third part, wherein at least one strain gauge is fitted to the third part on an opposite side of the third part relative to the annular grooves, aligned with the annular grooves on both sides of the first part, to measure the elongation at a relevant point in the third part;
a wireless transmitter for sending the measurement data to an operator;
a self-powered power supply for feeding an electric current to the strain gauges and the wireless transmitter;
a first space is formed in the scale to integrate the wireless transmitter inside the scale and a second space to integrate the self-powered power supply inside the scale.

17. A suspendable scale for weighing a bundle, comprising:
a first part for suspending the scale from a structure supporting the scale;
a second part for suspending an implement from the scale;
a third part joining the first part and second part, arranged to change shape from an effect of the implement acting on the first part and second part and caused by a bundle to be hoisted by the implement, the first part, second part, and third part being at least partly radially nesting relative to one another;
at least two strain gauges connected to the third part to form measurement data on forces acting on each strain gauge, on basis of deformation of the third part;
a wireless transmitter for sending the measurement data to an operator;
a self-powered power supply for feeding an electric current to the strain gauges and the wireless transmitter;
a first space is formed in the scale to integrate the wireless transmitter inside the scale and
a second space to integrate the self-powered power supply inside the scale, wherein the first space and second space are identical in surface area and shape in direction of a plane of the scale.

18. A suspendable scale for weighing a bundle, comprising:
a first part for suspending the scale from a structure supporting the scale;
a second part for suspending an implement from the scale;
a third part joining the first part and second part, arranged to change shape from an effect of the implement acting on the first part and second part and caused by a bundle to be hoisted by the implement, the first part, second part, and third part being at least partly radially nesting relative to one another;
four or eight strain gauges connected to the third part to form measurement data on forces acting on each strain gauge, on basis of deformation of the third part, wherein said strain gauges are situated on a first segment running through a center point of the first part symmetrically on either side belonging to the first part's center point, in such a way that on each side of the first part a number of strain gauges is half of a total number of strain gauges;
a wireless transmitter for sending the measurement data to an operator;
a self-powered power supply for feeding an electric current to the strain gauges and the wireless transmitter;
a first space is formed in the scale to integrate the wireless transmitter inside the scale and
a second space to integrate the self-powered power supply inside the scale, wherein the first space and the second space are identical in surface area and shape in a direction of a plane of the scale and the strain gauges are situated only on the first segment.

* * * * *